United States Patent
Katoh

(10) Patent No.: US 7,043,095 B2
(45) Date of Patent: May 9, 2006

(54) IMAGE SENSING APPARATUS WITH IMAGE QUALITY MODE SETTING AND DIGITAL SIGNAL PROCESSOR

(75) Inventor: Satoshi Katoh, Tokyo (JP)

(73) Assignee: NEC Corporation, Tokyo (JP)

(*) Notice: Subject to any disclaimer, the term of this patent is extended or adjusted under 35 U.S.C. 154(b) by 511 days.

(21) Appl. No.: 09/818,911

(22) Filed: Mar. 28, 2001

(65) Prior Publication Data
US 2001/0026648 A1    Oct. 4, 2001

(30) Foreign Application Priority Data
Mar. 29, 2000    (JP) .............................. 2000-090635

(51) Int. Cl.
G06K 9/20    (2006.01)
(52) U.S. Cl. ...................... 382/312; 382/100
(58) Field of Classification Search ................ 382/162, 382/251, 305, 312, 100; 348/220.1, 222.1, 348/224.1, 231.99, 333.01, 333.11; 358/1–16, 358/525; 341/156, 172
See application file for complete search history.

(56) References Cited

U.S. PATENT DOCUMENTS

| | | | | |
|---|---|---|---|---|
| 5,384,645 A | * | 1/1995 | Hasegawa et al. | 358/444 |
| 5,687,003 A | * | 11/1997 | Nagano | 358/445 |
| 6,639,626 B1 | * | 10/2003 | Kubo et al. | 348/218.1 |
| 6,686,957 B1 | * | 2/2004 | Johnson et al. | 348/222.1 |
| 2001/0010561 A1 | * | 8/2001 | Nagai | 348/371 |

FOREIGN PATENT DOCUMENTS

| | | | |
|---|---|---|---|
| EP | 760514 A2 | * | 3/1997 |
| JP | 01176119 A | * | 7/1989 |
| JP | 4-172878 | | 6/1992 |
| JP | 7-87379 | | 3/1995 |
| JP | 8-298601 | | 11/1996 |
| JP | 9-93470 | | 4/1997 |
| JP | 10-271365 | | 10/1998 |
| JP | 11-261871 | | 9/1999 |
| JP | 2000-50291 | | 2/2000 |

OTHER PUBLICATIONS

Japanese Office Action dated Sep. 16, 2003 with Partial English Translation.

* cited by examiner

Primary Examiner—Yon J. Couso
(74) Attorney, Agent, or Firm—McGinn IP Law Group, PLLC

(57) ABSTRACT

An image sensing apparatus in which an AD converter has a quantization bit count that can be modified, thereby reducing the power consumption of a digital signal processing circuit. The processing bit count of the digital signal processing circuit is made identical to the modified AD bit count. This provides improved image quality and reduced power consumption in the entire system.

22 Claims, 5 Drawing Sheets

IMAGE SENSING APPARATUS WITH IMAGE QUALITY MODE SETTING AND DIGITAL SIGNAL PROCESSOR

BACKGROUND OF THE INVENTION

1. Field of the Invention

The present invention relates to an image sensing apparatus such as an electronic still camera using a solid state image sensing element and in particular to an image sensing apparatus realizing power consumption reduction.

2. Description of the Related Art

The electronic still camera is now enlarging its market among the image sensing apparatuses. Recently, a serious competition is going on to increase the number of CCD pixels and the currently main model uses a CCD unit having 2 millions of pixels or above. In the year of 2000, models using a CCD unit exceeding 3 millions of pixels also appeared on market. Two factors can be considered as the main reason for increasing the number of pixels in the electronic still camera. Firstly, the CCD price has been reduced, the CPU efficiency has been greatly improved such as a Pentium processor (Trademark of Intel corporation), and a large-capacity storage medium has been developed. Accordingly, even a personal computer (hereinafter, referred to as PC) for consumer use can easily handle a large capacity of data.

Secondly, users are already not content with the VGA (640×480 pixels) or an image of one million of pixels which were the main stream a few years ago. Users are requesting for a further fine image. Accordingly, it is expected that the number of pixels will be further increased with more functions and the electronic still camera will find a variety of applications.

However, such an increased number of pixels and functions of the electronic still camera causes a problem of power consumption as the entire system. As the number of pixels is increased, the electrode capacity of the solid state image sensing element is also increased. Moreover, in order to obtain an image having a frame rate identical to the solid state image sensing element having a smaller number pixels, the drive frequency is also increased in proportion to the number of pixels. As a result, the drive circuit of the solid state image sensing element consumes more power and the operation frequency of the entire electronic still camera is also increased, thereby increasing the power consumption. Moreover, as the number of functions of the electronic still camera is increased, the number of peripheral apparatuses such as an LCD apparatus and a recording medium belonging to the entire system is also increased, thereby increasing the power consumption. As a result, the sensing-available time and the number of images that can be recorded are decreased. Thus, the high-performance system cannot exhibit its function sufficiently. That is, for development of the electronic still camera, the reduction of power consumption as a system is also a great problem.

SUMMARY OF THE INVENTION

It is therefore an object of the present invention to provide an image sensing apparatus realizing reduced power consumption.

The image sensing apparatus according to the present invention comprises as basic components: an image quality mode setting block for setting one of a plurality of image quality modes; a solid state image sensing element for converting an optical image into an electric analog signal; and an AD conversion block for converting the analog signal output from the solid state image sensing element, into a digital signal with a quantization bit count corresponding to an image quality mode set by the image quality mode selection block.

In a conventional image sensing apparatus as is disclosed in Japanese Patent Publication 4-172878 for example, an optical image is converted into an electric analog signal by a solid state image sensing element, this analog signal is converted into a digital signal with a maximum available quantization bit count, and this digital signal is further converted with a smaller quantization bit count. As compared to this, in the image sensing apparatus according to the present invention, an optical image is converted into an electric analog signal by a solid state image sensing element and the analog signal is converted into a digital signal with a necessary quantization bit count, thereby minimizing the power consumption in the AD conversion block and eliminating need to use power for further converting the digital signal with a smaller quantization bit count. This also eliminates need to provide a later stage circuit for converting the digital signal with a smaller quantization bit count.

The AD conversion block may be an AD converter for selecting one of a plurality of quantization bit count corresponding to the image quality mode.

Alternatively, the AD conversion block may be realized by a plurality of AD converters having different quantization bit counts, so that one of the AD converters is selected by an AD converter selection block corresponding to the image quality mode set by the image quality mode setting block.

In the image sensing apparatus, a higher image quality mode may correspond to a greater bit count and a lower image quality mode may correspond to a smaller bit count. As the quantization bit count is increased for the higher image quality mode, it is possible to improve the gradation.

According to another aspect of the present invention, the image sensing apparatus may further comprise a digital signal processing block for performing an image processing to the digital signal output from the AD conversion block, with a quantization bit count corresponding to an image quality mode set by the image mode setting block. By performing the image processing with a necessary quantization bit count to the digital signal output from the AD conversion block, it is possible to reduce the power consumption in the digital signal processing block.

The digital signal processing block may set a corresponding quantization bit count when an image quality mode is set by the image quality mode setting block.

According to still another aspect of the present invention, the image sensing apparatus may further comprise a data thinning block for thinning the output signal from the digital signal processing block.

In a conventional apparatus as disclosed in Japanese Patent Publication 9-93470, an output signal from a solid state image sensing element is directly thinned. That is, an image processing is performed using pixel data having little correlation, which may significantly lower the image quality. As compared to this, in the present invention, it is possible to perform an image processing using correlated pixel data, thereby enabling to obtain a high image quality.

According to yet another aspect of the present invention, the digital signal processing block may perform at least a color interpolation processing.

In a conventional image sensing apparatus in which an output signal from a solid state image sensing element is directly thinned and pixel data having little correlation is used for the color interpolation processing, a plenty of color-aliasing signals are generated, significantly deteriorating the image quality (for example, Japanese Patent Publication 9-93470. As compared to this, in the present invention, data after image processing is thinned and the color interpolation processing is performed using correlated pixel data, thereby enabling to obtain a high image quality.

According to still yet another aspect of the present invention, the image sensing apparatus may further comprise: an image storage block for storing the output signal from the digital signal processing block as an image data; and an image display block for displaying the image according to the output signal from the digital signal processing block. The image display block has a function to select whether to display the image while the image data is being stored in the image storage block. While the image storage block is storing image data, the image display block does not necessarily need to display an image. Accordingly, if no image is displayed by the image display block during this time, the power consumption can be saved.

According to still further aspect of the present invention, the image sensing apparatus may further comprise: an image storage block for storing the output signal from the digital signal processing block as an image data; and an image display block for displaying the image according to the output signal from the digital signal processing block, wherein the solid state image sensing element, the AD conversion block, and the digital signal processing block stop their operations while the image display block is displaying an image according to the image data stored in the image storage block. While an image is being displayed by the image display block according to the image data stored in the image storage block, the solid state image sensing element, the AD conversion block, and the digital signal processing block need not operate. Accordingly, by stopping the operations of the solid state image sensing element, the AD conversion block, and the digital signal processing block, it is possible to save the power.

According to yet another aspect of the present invention, the image sensing apparatus may be realized as an electronic still camera. Among various image sensing apparatuses, the power consumption reduction is especially required for the electronic still camera because of its apparatus size. Accordingly, a most remarkable effect can be obtained when the present invention is applied to the electronic still camera.

In other words, in the image sensing apparatus according to the present invention, the quantization bit count of the AD conversion block is modified according to the image quality mode selected by a user, and in accordance with this, the bit count of the digital signal processing block is also modified. Accordingly, it is possible to suppress deterioration of the image quality and greatly reduce the power consumption of the digital signal processing block without increasing the circuit size, thereby enabling to reduce the power consumption as the entire system.

BRIEF DESCRIPTION OF THE DRAWINGS

FIG. 3(a) shows a high quality image mode; FIG. 3(b) shows a standard quality image mode; and FIG. 3(c) shows an economy mode.

FIG. 4(d) shows a PC display mode, and FIG. 4(e) shows a reproduction mode.

DESCRIPTION OF THE PREFERRED EMBODIMENTS

Figure 1:
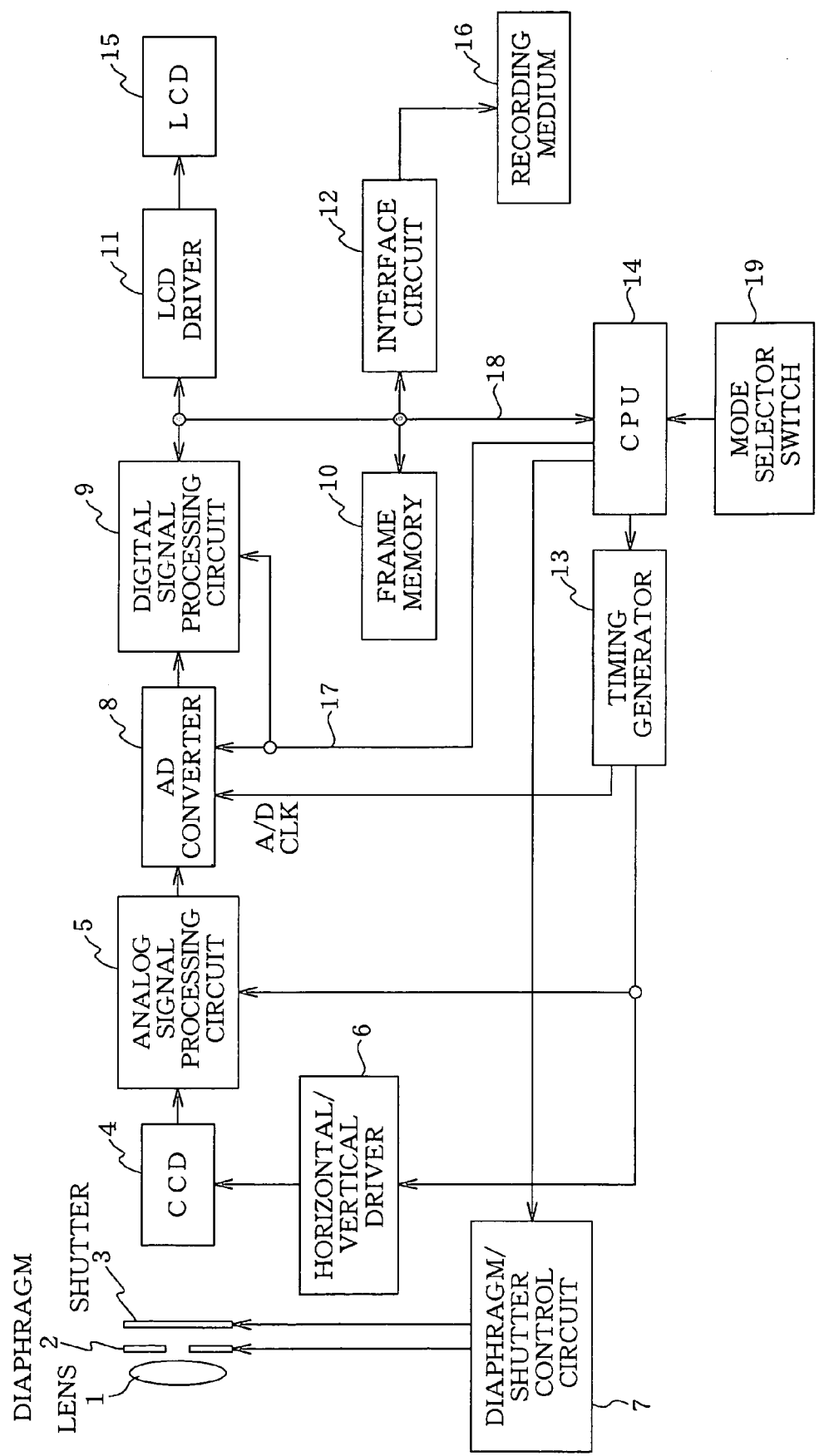
FIG. 1 is a block diagram showing an image sensing apparatus realized as an electronic still camera according to a first embodiment of the present invention.
Figure 2:
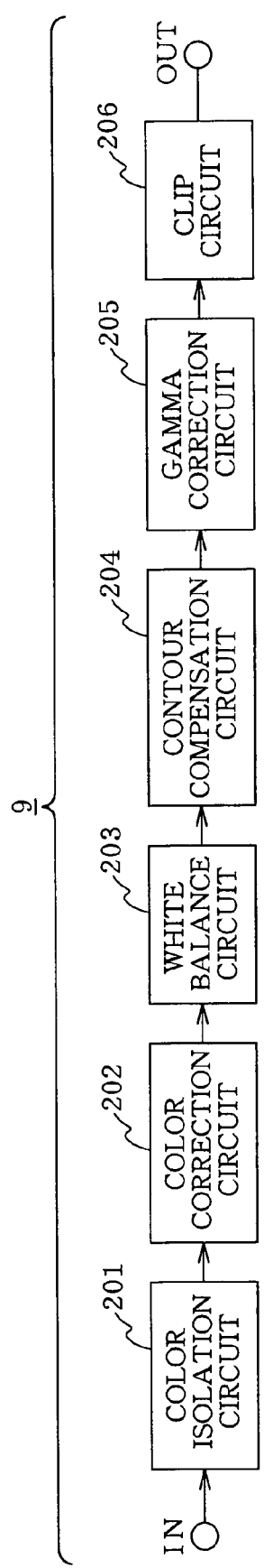
FIG. 2 is a block diagram showing an example of a digital signal processing circuit in the electronic still camera of FIG. 1.

FIG. 1 is a block diagram showing an image sensing apparatus realized as an electronic still camera according to a first embodiment of the present invention. FIG. 2 is a block diagram showing an example of a digital signal processing circuit in the electronic still camera of FIG. 1. Explanation will now be given with reference to these figures.

In this embodiment, the image sensing apparatus is realized as an electronic still camera; the image quality mode setting block is realized as a part of the function of a CPU 14 and mode selector switch 19; the solid state image sensing element is realized as a CCD 4; the AD conversion block is realized as an AD converter 8; the digital signal processing block is realized as a digital signal processing circuit 9; the data thinning block is realized as a part of the function of an LCD driver 11; the image storage block is realized as a part of the function of the CPU 14, a frame memory 10, an interface circuit 12, and a recording medium 16; the image display block is realized by a part of the function of the CPU 14, the LCD driver 11, and an LCD 15. In addition to these basic components, other components which will be detailed later are provided.

The CCD 4, although not depicted, includes: photoelectric conversion elements arranged in two-dimensional arrangement; a horizontal/vertical register driven by a drive pulse supplied from a horizontal/vertical driver 6 and transfers a signal; and a color filter array formed in a predetermined arrangement on the two-dimensionally arranged photoelectric conversion elements. An optical image of an object projected on the surface of the CCD 4 via a lens 1, a diaphragm 2, and a shutter 3 in the open state is converted into electric signals by the photoelectric conversion elements, which signals are successively output to an external circuit by the horizontal/vertical register.

A video signal output from CCD 4 is supplied to an analog signal processing circuit 5, where a noise component such as a reset noise and a shot noise caused by a dark current is removed. Subsequently, an output signal from the analog signal processing circuit 5 is input to an AD converter 8, where the signal is converted into a digital signal with a predetermined quantization bit count. Here, the AD converter 8 is constituted so as to be able to change the quantization bit count according to a bit count conversion signal 17 supplied from the CPU 14. The digital signal converted by the AD converter 8 is subjected to a predetermined image processing by a digital signal processing circuit 9 at the later stage, so as to become a color video signal.

Here, explanation will be given on a general configuration of the digital signal processing circuit with reference to FIG. 2. The signal output from the CCD 4 having the color filter array cannot be used as a color video signal as it is. Firstly, a color isolation circuit 201 performs a color signal interpolation and the signal becomes, for example, RGB color signal. Next, the signal is subjected to a linear matrix processing by a color correction circuit 202, so as to improve the color reproducibility. In a white balance circuit 203, the gain of the color video signal is adjusted so as to always maintain a constant color reproducibility not depending on the photographing illumination condition of the object. In a contour compensation circuit 204, the clearness of the image is compensated. In a gamma correction circuit 205, a non-linear processing is performed in accordance with the I/O characteristic of a display monitor. Lastly, signals above a predetermined level and below another predetermined level are removed in a clip circuit 206 and a color video signal subjected to the image processing is output.

The color video signal output from the digital signal processing circuit 9 is supplied via an internal bus 18 to the LCD driver 11, the interface circuit 12, the frame memory 10, the CPU 14, and the like. The frame memory 10 temporarily stores the color video signal and supplies data to the LCD driver 11, the interface circuit 12, and the CPU 14, and the like when required. The LCD driver 11 is a driver circuit for converting the image data to display the video signal on the LCD 15. When converting the image data in the LCD driver 11, data is thinned because the CCD output signal data count is greater than the data count required for LCD display.

Here, in the prior art, the CCD output signal is directly thinned (as is disclosed in the aforementioned Japanese Patent Publication 9-93470). However, when the CCD output signal is directly thinned, the color interpolation processing is to be performed using a less relevant pixel data, which causes a great amount of color-aliasing signals. Accordingly, it is preferable to perform the thinning after the color interpolation. In this embodiment, the color interpolation is performed using all the CCD 4 output signals before performing the data thinning in the LCD driver 11, thereby enabling to suppress generation of the color-aliasing signal.

The interface circuit 12, as shown in FIG. 1 for example, is a circuit for supplying a video signal to the recording medium 16 such as a memory card, a hard disc, and a magnetic tape. Moreover, the interface circuit 12 may be used not only for the recording medium 16 but also as an external bus interface to a personal computer such as IEEE 1394, USB, SCSI, and a printer.

The CPU 14 controls the entire system. For example, the CPU 14 controls the timing generator 13 and the diaphragm/shutter control circuit 7 through the setting of the mode selector switch 19 and the image data calculation, thereby providing an optimal photographing condition at the site. Moreover, the CPU 14 calculates various coefficients in the digital signal processing circuit 9 and modifies the signal processing contents. Moreover, the CPU 14 controls the setting of the mode selector switch 19 so as to display the video signal on the LCD 15 and record it in the recording medium 16.

Figure 3:
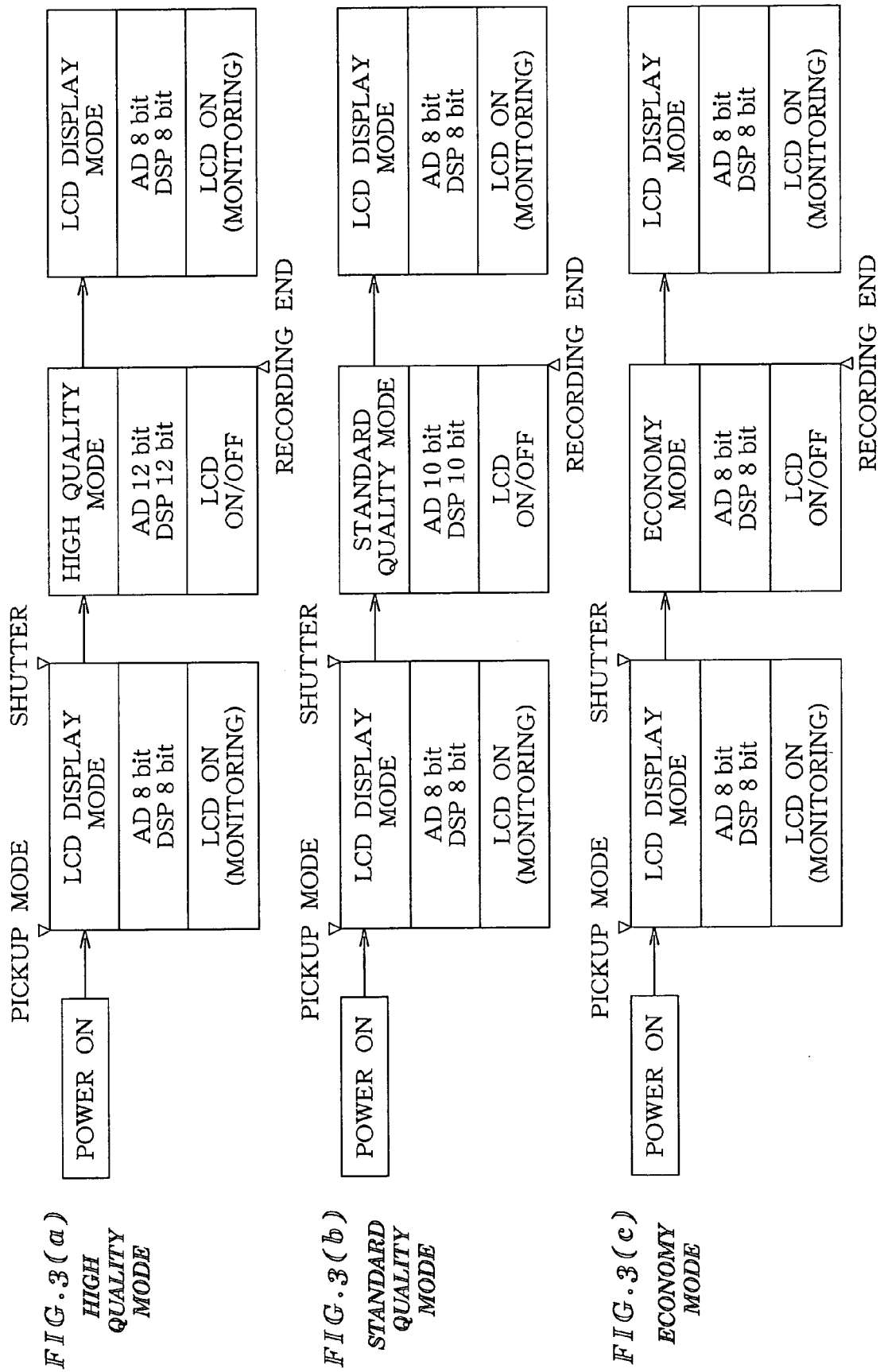
FIG. 3 is a sequence diagram showing an operation example of the electronic still camera shown in FIG. 1.
Figure 4:
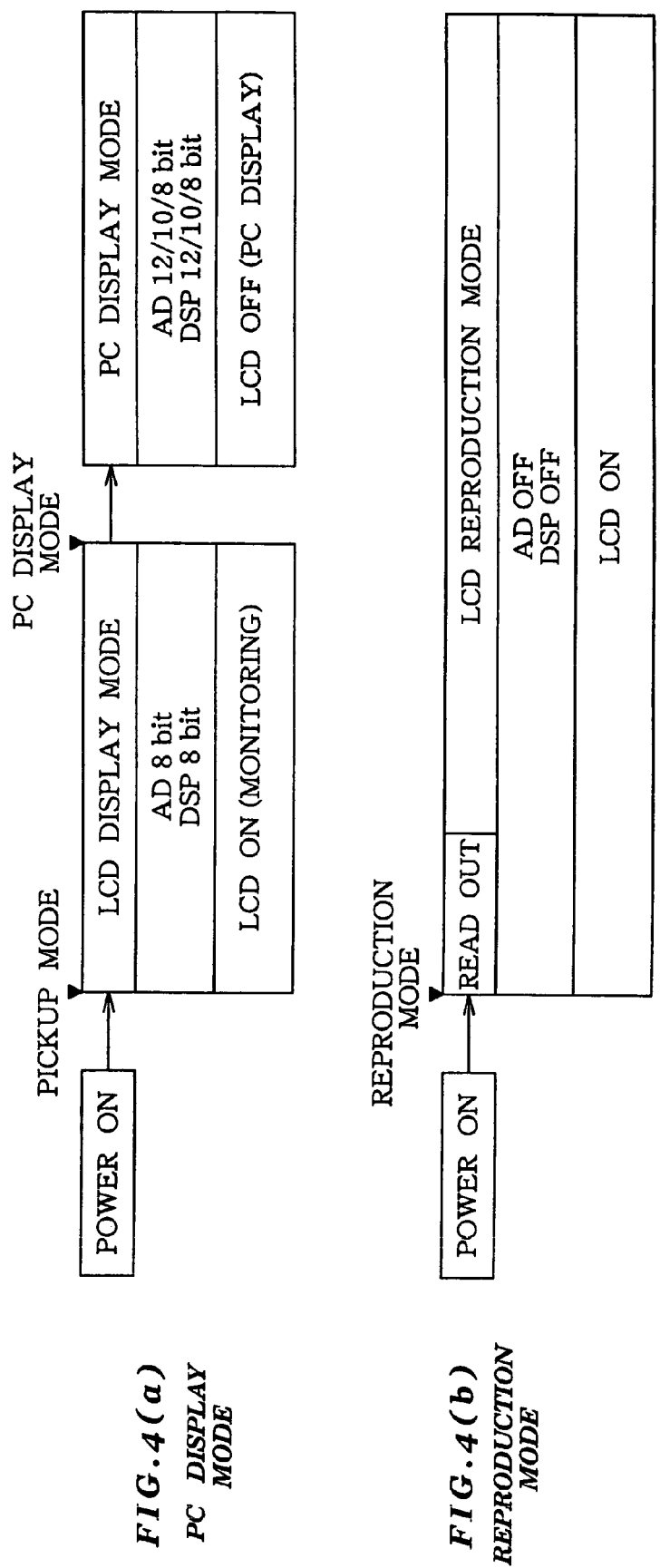
FIG. 4 is a sequence diagram showing an operation example of the electronic still camera shown in FIG. 1.

FIG. 3 and FIG. 4 show a sequence diagram showing an operation example in the electronic still camera according to the present invention. Hereinafter, explanation will be given on the electronic still camera of the present embodiment with reference to FIG. 1 to FIG. 4.

Firstly, explanation will be given on the "high quality mode" shown in FIG. 3(a). After a user turns on the power switch and operates the mode selector switch 19 to set the high quality mode (or sets a pickup mode and then turns on the power switch), the user should monitor an object on the LCD 15. Accordingly, the electronic still camera operates in the "LCD display mode".

In the case of the LCD display, in general, the LCD 15 has a display pixel data count smaller than the pixel count of the CCD 4 and accordingly, it is necessary to reduce the data count. In the present embodiment, in order to prevent deterioration of the image quality, as has been described above, instead of performing direct thinning of the CCD 4 output signal, the signal processing bit count is reduced and the color interpolation is performed before performing the data thinning. That is, in this case, the CPU 14 supplies the bit count conversion signal 17 so as to make the quantization bit count, for example, to be 8 bits. Upon reception of this signal, the AD converter 8 and the digital signal processing circuit 9 perform an 8-bit quantization (AD conversion) and the color signal processing, thereby reducing the data amount and performing the color interpolation. After this, the LCD driver 11 performs the data thinning and displays the monitoring image on the LCD 15.

Subsequently, the user specifies the object and presses the shutter button. Then, the CPU 14 immediately switches the operation mode to the high quality mode and supplies the bit count conversion signal 17 to the AD converter 8 and the digital signal processing circuit 9. The bit count conversion signal 17 modifies the bit count of the AD converter and the digital signal processing circuit, for example, to 12 bits. During the high quality mode, signal processing is performed with 12 bits. The user can select whether to display the image on the LCD 15 during this time. After the color signal processing, data is recorded in the recording medium 16. Upon completion of the data recording, the CPU 14 switches the operation mode to the LCD display mode for the next object and the count conversion signal 17 modifies the bit count of the AD converter and the digital signal processing circuit 9 to 8 bits, thereby saving the power consumption.

Next, explanation will be given on the "standard quality mode" shown in FIG. 3(b). After the user turns on the power switch and operates the mode selector switch 19 to set the standard quality mode (or sets the pickup mode and then turns on the power switch), the user should monitor an object on the LCD 15. Accordingly, the electronic still camera operates in the "LCD display mode". In this case, the CPU 14, as has been described above, supplies the bit count conversion signal 17 indicating the quantization bit count of 8 bits, for example, to the AD converter 8 and the digital signal processing circuit 9. Upon reception of this signal, the AD converter and the digital signal processing circuit 9 performs the 8-bit quantization (AD conversion) and the color signal processing and displays a monitoring image on the LCD 15.

Subsequently, the user specifies an object and presses the shutter button. The CPU 14 immediately switches the operation mode to the standard quality mode and supplies the bit count conversion signal 17 to the AD converter and the digital signal processing circuit 9. By this bit count conversion signal 17, the bit count of the AD converter 8 and the digital signal processing circuit 9 is modified, for example, to 10 bits. In the standard quality mode, as compared to the high quality mode, the signal processing is performed with the quantization bit count smaller by 2 bits and accordingly, it is possible to reduce the signal processing time and the power consumption as well as to increase the number of recorded images.

In the standard quality mode, the signal processing is performed with 10 bits. The user can select whether to display the image on the LCD 15 during this signal processing. When the data recording onto the recording medium 16 is complete, the CPU 14 switches the operation mode to the LCD display mode for the next object and, with the bit count conversion signal 17, converts the bit count of the AD converter 8 and the digital signal processing circuit 9 to 8 bits, thereby saving the power consumption.

Next, explanation will be given on the "economy mode" shown in FIG. 3(*c*). After the user turns on the power switch and operates the mode selector switch 19 to set the economy mode (or sets a pickup mode and then turns on the power switch), the user should monitor an object on the LCD 15. Accordingly, the electronic still camera operates in the "LCD display mode". In this case, the CPU 14, as has been described above, supplies the bit count conversion signal 17 indicating the quantization bit count of 8 bits, for example, to the AD converter 8 and the digital signal processing circuit 9. Upon reception of this signal, the AD converter and the digital signal processing circuit 9 performs the 8-bit quantization (AD conversion) and the color signal processing and displays a monitoring image on the LCD 15.

Subsequently, the user specifies an object and presses the shutter button. The CPU 14 immediately switches the operation mode to the economy mode and is going to convert the bit count of the AD converter and the digital signal processing circuit 9 to 8 bits. However, in this case, in the LCD display mode prior to pressing the shutter button, the AD converter 8 and the digital signal processing circuit 9 have been set to 8 bits. Accordingly, there is no need to modify the bit count. Accordingly, the CPU does not generate the bit count conversion signal 17 and the AD converter 8 and the digital signal processing circuit 9 performs the signal processing with 8 bits as is set and the recording is performed. In the economy mode, as compared to the standard quality mode, the signal processing is performed with the quantization bit count smaller by 2 bits and accordingly, it is possible to reduce the signal processing time and the power consumption as well as to increase the number of recorded images.

In the economy mode, the signal processing is performed with 8 bits. The user can select whether to display the image on the LCD 15 during this signal processing. When the data recording onto the recording medium 16 is complete, the CPU 14 switches the operation mode to the LCD display mode for the next object.

Next, explanation will be given on the "PC mode" shown in FIG. 4(*a*). This mode is used to display an image obtained by the electronic still camera, on a personal computer. Explanation will be given on a case that a user turns on the power switch, checks an object on the LCD display mode, and sets the PC display mode. It should be noted that the PC display mode can also be set without using the LCD display mode.

When the user switches from the LCD display mode to the PC display mode, the CPU 14 controls to turn off the LCD 15 and the data bus 18 to transfer data to the PC. For example, data is transferred to a personal computer via the aforementioned IEEE 1394, the USB, or the SCSI interface. Here, the user can select an image quality to be displayed by the personal computer. The CPU 14 detects the bit count conversion signal according to the selected quality and modifies the bit count of the AD converter 8 and the digital signal processing circuit 9.

Next, explanation will be given on the reproduction mode shown in FIG. 4(*b*). In this case, the image data to be reproduced is data which has been subjected to the signal processing of the aforementioned quality mode and stored in the recording medium 16, the frame memory 10, the personal computer hard disc, and the like. In order to read out this data and process it in the LCD driver 11 so as to be displayed, operation of those components not related to the reproduction process such as CCD 4, the analog signal processing circuit 5, the AD converter 8, and the digital signal processing circuit 9 is stopped, thereby reducing the power consumption. Accordingly, there is no need of bit modification of the AD converter 8 and the digital signal processing circuit 9.

Next, explanation will be given on effects of the electronic still camera according to the present embodiment.

Firstly, according to the image quality mode selected by the user, the quantization bit count of the AD converter 8 is modified and the bit count of the digital signal processing circuit 9 is also modified in accordance with the bit count of the AD converter 8. Accordingly, without providing signal processing circuits for the respective modes to increase the circuitry size, especially when the standard quality mode or the economy mode is selected, the power consumption of the AD converter 8 and the digital signal processing circuit 9 is significantly reduced, thereby enabling to realize a reduced power consumption as the entire system.

Moreover, in the high quality mode, the signal processing with 12 bits is performed only for storing data in the recording medium 16 from the AD converter 8 via the digital signal processing circuit 9 and in the most of time, power consumption is saved as the LCD display mode. Accordingly, it is possible to save the power consumption of the entire system.

Moreover, when reducing the data amount in the standard quality mode and the economy mode, instead of thinning data from the video signal processed by a highly quantization bit count, the signal processing is performed with the bit count according to the mode before reducing the number of data, thereby preventing deterioration of the image quality.

Furthermore, when reducing the data amount for the LCD display, instead of directly thinning the CCD output signal, the quantization bit count is reduced and the color interporation is performed between intimately correlated signals before thinning the data. This enables to suppress generation of the color-aliasing signal and deterioration of the image quality.

Figure 5:
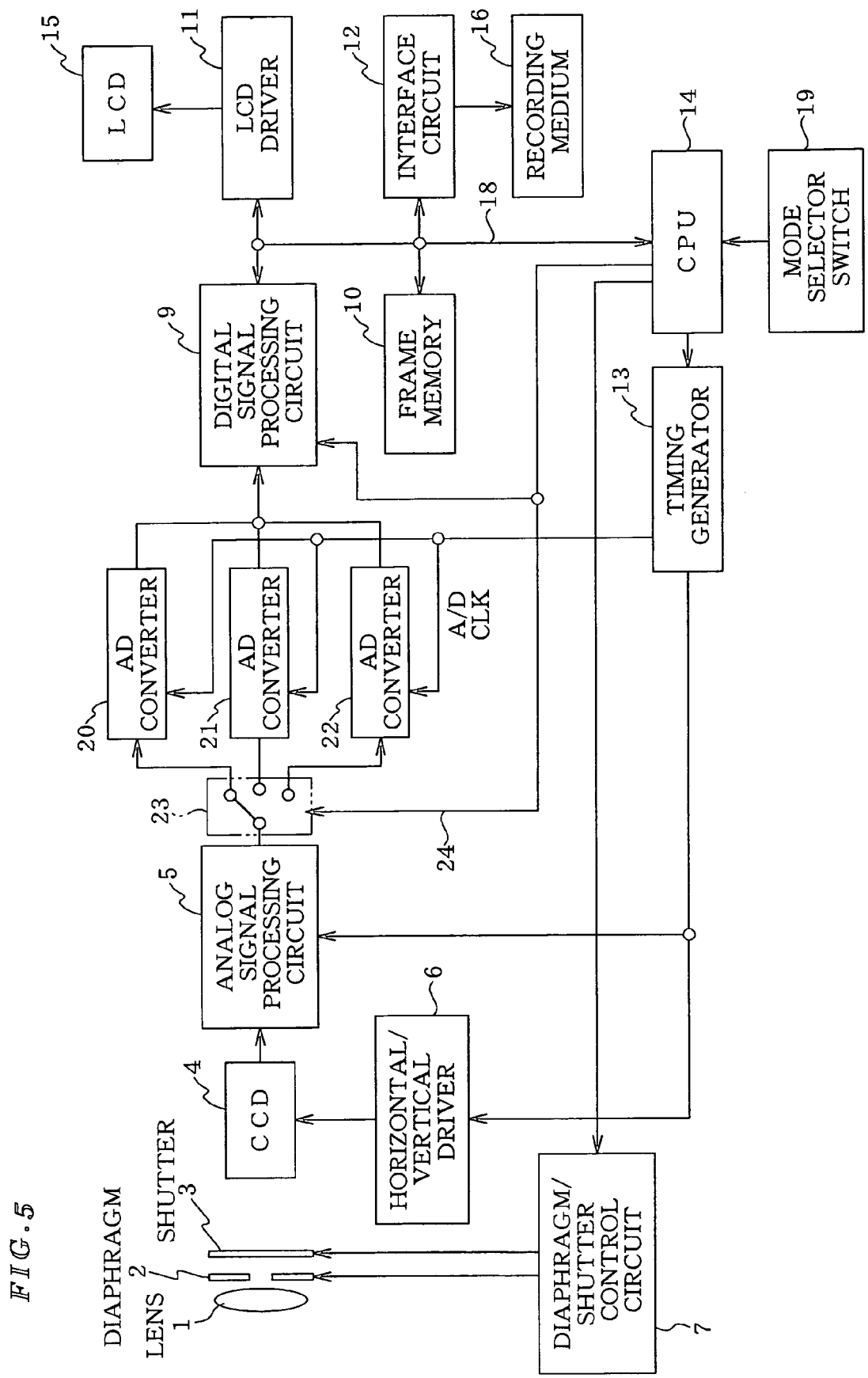
FIG. 5 is a block diagram showing an image sensing apparatus according to a second embodiment of the present invention.

FIG. 5 is a block diagram of an image sensing apparatus according to a second embodiment of the present invention. Hereinafter, explanation will be given with reference to this figure. It should be noted that like components as in FIG. 1 are denoted by like reference symbols and their explanations are omitted. In this embodiment, components described in claims are realized as follows. The AD conversion block is realized as AD converters 20 to 22 and the AD converter selection block is realized as a switching circuit 23.

This embodiment differs from the first embodiment in the following configuration. The AD converter 8 having the variable bit count is replaced by, for example, a 12-bit AD converter 20, a 10-bit AD converter 21, and an 8-bit AD converter 22. The switching circuit 23 is controlled by an AD converter selection signal 24 from the CPU 14 according to the image quality mode. When the high quality mode is selected, the AD converter 20 having the greatest quantization bit count is selected. When the standard quality mode is selected, the 10-bit AD converter 21 is selected. When the economy mode is selected, the AD converter 22 having the smallest quantization bit count is selected. In this case, the CPU 14 reads in the setting state of the switch circuit 23 and modifies the signal processing contents of the digital signal processing circuit 9 according to the bit count setting. This embodiment has the same effect as the first embodiment.

It should be noted that in the aforementioned embodiments, explanation has been given on the present invention applied to an electronic still camera but the present invention can also be applied to an image sensing apparatus other than the electronic still camera. Moreover, in the aforementioned embodiments, explanation has been given on a configuration using the LCD 15 for monitoring an object but the same effect can be obtained even when using a display apparatus other than the LCD 15. Moreover, explanation has been given on a case of the quantization bit count as 12 bits for the high quality mode, 10 bits for the standard mode, and 8 bits for the economy mode. However, other bit counts other than these can also be selected. Moreover, the bit count conversion signal 17 and the AD converter selection signal 24 output from the CPU 14 may be also be supplied via the internal bus 18. Moreover, in the aforementioned embodiments, explanation has been given on a configuration in which the output signal from the CCD 4 is subjected to an analog signal processing and then AD-converted but the signal processing may be realized by a digital signal processing circuit. Moreover, the present invention can have the aforementioned effects regardless of whether utilized for a motion picture or a still picture. Moreover, the operation sequence shown in FIG. 3 and FIG. 4 is only an example of the operation of the present invention and it is possible to apply other sequences without departing from the spirit of the present invention. Furthermore, the present invention can be embodied in combination with a conventional technique.

According to the image sensing apparatus of the present invention, an optical image is converted into an analog signal by a solid state image sensing element and this analog signal is converted into a digital signal with a necessary quantization bit counts, thereby enabling to minimize the power consumption in the AD converter and eliminate the power consumption for conversion of the digital signal with a further smaller quantization bit count. Thus, it is possible to reduce the power consumption. Moreover, no later-stage circuit is required for converting the digital signal with a further smaller qunatization bit count. Thus, it is possible to reduce the circuit size.

The AD conversion block may be realized by a plurality of AD converters having different quantization bit counts, so that one of the AD converters is selected by an AD converter selection block corresponding to the image quality mode set by the image quality mode setting block. Thus, it is possible to readily realize the AD conversion block by using existing AD converters.

In the image sensing apparatus according to the present invention, a higher image quality mode corresponds to a greater bit count and a lower image quality mode corresponds to a smaller bit count. Thus, it is possible to reduce the power consumption in the lower quality mode and to obtain a high quality image with an improved gradation in the higher quality mode.

In the image sensing apparatus according to another aspect of the present invention, the digital signal output from the AD conversion block is subjected to an image processing with a corresponding quantization bit, thereby enabling to minimize the power consumption in the digital signal processing block. This further reduces the power consumption in the apparatus.

According to still another aspect of the present invention, it is possible to thin data from correlated pixel data after subjected to the image processing, thereby enabling to reduce the power consumption as well as to obtain a high quality image.

According to yet another aspect of the present invention, by thinning data after subjected to the image processing, it is possible to perform color interpolation processing using correlated pixel data, thereby enabling to reduce the power consumption while maintaining a high quality image.

According to still yet another aspect of the present invention, the image display block displays no image while the image data is being stored in the image storage block, thereby enabling to reduce the power consumption.

According to yet another aspect of the present invention, the solid state image sensing element, the AD conversion block, and the digital signal processing block stop their operations while the image display block is displaying an image according to the image data stored in the image storage block. This enables to reduce the power consumption.

According to still yet another aspect of the present invention, the image sensing apparatus is realized as an electronic still camera. Among various image sensing apparatuses, especially the electronic still camera requires reduction of power consumption. Accordingly, it is possible to obtain the most remarkable effect.

Next, the effects of the image sensing apparatus according to the present invention will be repeated in other words.

In the image sensing apparatus according to the present invention, it is possible to realize a great reduction of the power consumption in the entire system. This is because it is possible to modify the quantization bit count in the AD converter according to the image quality mode selected by a user, thereby enabling to realize a remarkable reduction of power consumption in the AD converter and the digital signal processing circuit.

Moreover, it is possible to suppress deterioration of the image quality in an image of a lower image quality mode such as the standard quality mode and the economy mode. This is because even in the low quality mode processing, instead of reducing the number of data items by direct data thinning, the bit count of the data processing itself is reduced in the signal processing.

Furthermore, it is possible to suppress generation of a color-aliasing signal in the LCD display image, thereby minimizing the image quality lowering. This is because in the data amount reduction for the LCD display, instead of directly thinning the CCD output signal to reduce the data mount, the quantization bit count is reduced and a color interpolation processing is performed between intimately correlated signals before performing the data thinning.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-090635 (Filed on Mar. $29^{th}$, 2000) including specification, claims, drawings and summary are incorporated herein by reference in its entirety.

What is claimed is:
1. An image sensing apparatus, comprising:
an image quality mode setting block for setting one of a plurality of image quality modes;
a solid state image sensing element for converting an optical image into an electric analog signal; and an AD converter for converting the analog signal output from the solid state image sensing element into a digital signal with a quantization bit count corresponding to the image quality mode set by the image quality mode setting block, wherein the AD converter converts the analog signal output into a digital signal with a quantization bit count selected from a plurality of quantization bit counts, the selected quantization bit count corresponding to the set image quality mode.

2. The image sensing apparatus as claimed in claim 1, wherein a higher image quality mode corresponds to a greater bit count and a lower image quality mode corresponds to a smaller bit count.

3. The image sensing apparatus as claimed in claim 1, further comprising a digital signal processing block for performing image processing of the single digital signal output from the AD converter, the digital signal processing block having a quantization bit count corresponding to the image quality mode set by the image quality mode setting block.

4. The image sensing apparatus as claimed in claim 3, wherein the digital signal processing block sets a corresponding quantization bit count when an image quality mode is set by the image quality mode setting block.

5. The image sensing apparatus as claimed in claim 3, further comprising a data thinning block for thinning the output signal from the digital signal processing block.

6. The image sensing apparatus as claimed in claim 5, wherein the digital signal processing block performs color interpolation processing.

7. The image sensing apparatus as claimed in claim 3, further comprising an image storage block for storing the output signal from the digital signal processing block as image data.

8. The image sensing apparatus as claimed in claim 3, further comprising:
an image storage block for storing the output signal from the digital signal processing block as image data; and
an image display block for displaying an image according to the output signal from the digital signal processing block,
wherein the solid state image sensing element, the AD converter, and the digital signal processing block stop operation while the image display block is displaying an image according to image data stored in the image storage block.

9. The image sensing apparatus as claimed in claim 1, wherein the image sensing apparatus comprises an electronic still camera.

10. The image sensing apparatus as claimed in claim 1, wherein said AD converter receives a bit count conversion signal from said image quality mode setting block, and converts the analog signal based on the bit count conversion signal.

11. The image sensing apparatus as claimed in claim 7, further comprising an image display block for displaying an image according to the output signal from the digital signal processing block, the image display block selecting whether to display the image during storage of image data in the image storage block.

12. An image sensing apparatus, comprising:
an image quality mode setting block for setting one of a plurality of image quality modes;
a solid state image sensing element for converting an optical image into an electric analog signal; and
an AD conversion block for converting the analog signal from the solid state image sensing element into a digital signal, the AD conversion block having a plurality of quantization bit counts corresponding respectively to the plurality of image quality modes,
wherein the AD conversion block is responsive to the image quality mode set by the image quality mode setting block to enable the quantization bit count corresponding to the set image quality mode and to disable the other quantization bit counts.

13. The image sensing apparatus as claimed in claim 12, wherein the AD conversion block comprises an AD converter having a plurality of quantization bit counts corresponding respectively to the image quality modes, wherein the image quality mode setting block selects one of the quantization bit counts.

14. The image sensing apparatus as claimed in claim 12, wherein a higher image quality mode corresponds to a greater bit count and a lower image quality mode corresponds to a smaller bit count.

15. The image sensing apparatus as claimed in claim 12, further comprising a digital signal processing block for performing image processing of the digital signal from the AD conversion block.

16. The image sensing apparatus as claimed in claim 15, wherein the digital signal processing block sets a corresponding quantization bit count when an image quality mode is set by the image quality mode setting block.

17. The image sensing apparatus as claimed in claim 15, further comprising a data thinning block for thinning the output signal from the digital signal processing block.

18. The image sensing apparatus as claimed in claim 17, wherein the digital signal processing block performs color interpolation processing.

19. The image sensing apparatus as claimed in claim 15, further comprising:
an image storage block for storing the output signal from the digital signal processing block as image data.

20. The image sensing apparatus as claimed in claim 19, further comprising an image display block for displaying the image according to the output signal from the digital signal processing block, the image display block selecting whether to display the image during storage of the image data in the image storage block.

21. The image sensing apparatus as claimed in claim 15, further comprising:
an image storage block for storing the output signal from the digital signal processing block as image data; and
an image display block for displaying the image according to the output signal from the digital signal processing block,
wherein the solid state image sensing element, the AD conversion block, and the digital signal processing block stop operating displaying by the image display block of an image based on image data stored in the image storage block.

22. The image sensing apparatus as claimed in claim 12, wherein the image sensing apparatus comprises an electronic still camera.

* * * * *